US011727399B2

(12) United States Patent
Bansal et al.

(10) Patent No.: US 11,727,399 B2
(45) Date of Patent: Aug. 15, 2023

(54) METHOD, SYSTEM, AND COMPUTER PROGRAM PRODUCT FOR SECURE DECRYPTION

(71) Applicant: Visa International Service Association, San Francisco, CA (US)

(72) Inventors: Naman Bansal, Bellevue, WA (US); Pankaj Taneja, Lynnwood, WA (US)

(73) Assignee: Visa International Service Association, San Francisco, CA (US)

( * ) Notice: Subject to any disclaimer, the term of this patent is extended or adjusted under 35 U.S.C. 154(b) by 307 days.

(21) Appl. No.: 16/696,416

(22) Filed: Nov. 26, 2019

(65) Prior Publication Data

US 2021/0158345 A1    May 27, 2021

(51) Int. Cl.
*G06Q 20/38*    (2012.01)
(52) U.S. Cl.
CPC ..... *G06Q 20/3829* (2013.01); *G06Q 2220/00* (2013.01)
(58) Field of Classification Search
CPC .............. G06Q 20/3829; G06Q 2220/00
See application file for complete search history.

(56) References Cited

U.S. PATENT DOCUMENTS

| | | | | |
|---|---|---|---|---|
| 4,386,266 A | * | 5/1983 | Chesarek | G07F 7/1016 705/72 |
| 8,571,995 B2 | * | 10/2013 | Spies | G06Q 20/3823 705/71 |
| 9,819,485 B2 | * | 11/2017 | Chastain | H04L 63/062 |
| 2015/0271150 A1 | * | 9/2015 | Barnett | H04L 63/0876 713/171 |

FOREIGN PATENT DOCUMENTS

| | | | | |
|---|---|---|---|---|
| GB | 2549118 A | * | 10/2017 | ............ G06Q 20/02 |
| WO | WO-2006100236 A1 | * | 9/2006 | ............ G06F 21/10 |

OTHER PUBLICATIONS

M. Yadav, K. Singh and A. S. Pandey, "Key management in efficient and secure group communication," 2016 International Conference on Emerging Trends in Electrical Electronics & Sustainable Energy Systems (ICETEESES), 2016, pp. 196-203, doi: 10.1109/ICETEESES.2016.7581384. (Year: 2016).*

Gupta, Himanshu, and Vinod Kumar Sharma. "Role of multiple encryption in secure electronic transaction." International Journal of Network Security & Its Applications 3.6 (2011): 89. (Year: 2011).*

\* cited by examiner

*Primary Examiner* — James M Detweiler
*Assistant Examiner* — Monica A Mandel
(74) *Attorney, Agent, or Firm* — The Webb Law Firm

(57) ABSTRACT

A method for secure decryption may include receiving encrypted transaction data associated with a transaction from a first computing device. The encrypted transaction data may be encrypted using a first public key and may include a transaction type identifier and a device identifier. A first decryption technique may be selected based on the type of the transaction. A first private key identifier may be retrieved from a database based on the first decryption technique and the device identifier. The first private key identifier and the encrypted transaction data may be communicated to a key vault. Decrypted transaction data associated with the transaction may be received from the key vault. First transaction data based on the decrypted transaction data may be communicated to the first computing device. A system and computer program product are also disclosed.

15 Claims, 4 Drawing Sheets

METHOD, SYSTEM, AND COMPUTER PROGRAM PRODUCT FOR SECURE DECRYPTION

BACKGROUND

1. Field

This disclosed subject matter relates generally to methods, systems, and products for secure decryption and, in some particular embodiments, to a method, system, and computer program product for secure decryption using a centralized key vault.

2. Technical Considerations

Certain industries and/or networks associated therewith may rely on cryptography and the proper implementation thereof. For example, electronic payment networks may rely heavily on cryptography to ensure transaction data and/or data related thereto remains secure when shared over the network. Additionally, entities associated with such industries and/or networks may need to implement multiple cryptography protocols (e.g., algorithms, schemes, and/or the like) and/or maintain multiple cryptographic keys (e.g., public keys, private (e.g., secret) keys, session keys, symmetric keys, and/or the like) associated with such protocols. For example, each entity (e.g., payment gateway, merchant system and/or transaction terminal thereof, and/or the like) may implement several cryptographic protocols to ensure transactions of different types (e.g., magnetic stripe reader (MSR), smart card (e.g., integrated circuit (IC) card, EMV® card, and/or the like), contactless (e.g., near-field communication (NFC), radio frequency identification (RFID), cellular phone, smart phone, mobile device, wearable device, Google Pay®, Android Pay®, Apple Pay®, Samsung Pay®, payWave®, and/or the like), card-not-present (CNP), e-commerce (e.g., Visa® Checkout), and/or the like) are secure, comply with security standards (e.g., cryptographic standards and/or the like) of the payment type and/or other entities in the payment network (e.g., acquirers, issuers, transaction service providers, and/or the like), and/or the like. For example, depending on the type of transaction, the payload of a transaction message (e.g., authorization request and/or the like) from a merchant system and/or transaction terminal (e.g., point-of-sale terminal and/or the like) thereof may have a different format and/or different cryptographic protocol applied thereto. Additionally, other data related to and/or included in a transaction message (e.g., a personal identification number (PIN), biometric data, and/or the like) may have also have a different cryptographic protocol applied thereto.

However, it can be cumbersome for entities in such networks to each separately maintain cryptographic keys (e.g., for each different type of transaction and/or the like). For example, in addition to the number of different keys for different cryptographic protocols, some such keys must be coordinated with (e.g., synchronized with, deployed with or to, and/or the like) other entities in the network. Further, having cryptographic keys maintained by multiple separate entities with separate systems may increase security risk since an attacker may target any one of and/or multiple of the entities, and such attacks may be unbeknownst to the other entities in the network (e.g., a successful attack on one entity may compromise the other entities since the other entities may not be aware that the keys of the attacked entity are compromised). An attacker may also intercept such keys when they are deployed (e.g., communicated and/or the like) from one entity to another. Moreover, when each entity maintains and/or deploys its own keys, it may be difficult or impossible for other entities to determine and/or monitor the activities of one of the entities in the network. For example, an entity may be required to handle one or more types of transactions in a certain manner (e.g., based on a security standard, applicable regulations, agreements, and/or the like) with respect to the other entities (e.g., exclusively route transaction messages to a certain other entity, route a percentage of messages to such other entity, apply additional cryptographic protocols (e.g., decryption, encryption, re-encryption, and/or the like) to such transaction messages, and/or the like), but if that entity maintains and/or deploys its own cryptographic keys, such entity may decrypt the payload of the transaction message and handle and/or process such transaction message in any desired manner (e.g., in contravention of the aforementioned requirements and/or the like).

SUMMARY

Accordingly, it is an object of the presently disclosed subject matter to provide methods, systems, and computer program products for secure decryption.

According to non-limiting embodiments, provided is a computer-implemented method for secure decryption. In some non-limiting embodiments, a computer-implemented method for secure decryption may include receiving encrypted transaction data associated with a transaction from a first computing device. The encrypted transaction data may be encrypted using a first public key. The encrypted transaction data may include a transaction type identifier associated with a type of the transaction and a device identifier associated with at least one device associated with the transaction. A first decryption technique may be selected from a plurality of decryption techniques based on the type of the transaction associated with the transaction type identifier. A first private key identifier may be retrieved from a database of private key identifiers based on the first decryption technique and the device identifier. The first private key identifier and the encrypted transaction data may be communicated to a key vault. Decrypted transaction data associated with the transaction may be received from the key vault. First transaction data based on the decrypted transaction data may be communicated to the first computing device.

In some non-limiting embodiments, the at least one device may include at least one transaction terminal.

In some non-limiting embodiments, the key vault may include at least one hardware security module (HSM). Additionally or alternatively, the HSM may receive the first private key identifier and the encrypted transaction data, determine a first private key based on the first private key identifier, decrypt the encrypted transaction data using the first private key to form the decrypted transaction data, and/or communicate the decrypted transaction data.

In some non-limiting embodiments, the first transaction data may include the decrypted transaction data.

In some non-limiting embodiments, the decrypted transaction data may be encrypted using a second public key to form the first transaction data. Additionally or alternatively, the second public key may be associated with the at least one device associated with the device identifier.

According to non-limiting embodiments, provided is a system for secure decryption. In some non-limiting embodiments, the system for secure decryption may include a perimeter zone system, which may receive encrypted transaction data associated with a transaction from a first computing device. The encrypted transaction data may be encrypted using a first public key. The encrypted transaction data may include a transaction type identifier associated with a type of the transaction and a device identifier associated with at least one device associated with the transaction. The perimeter zone system may communicate the encrypted transaction data to an enterprise zone system. The enterprise zone system may select a first decryption technique from a plurality of decryption techniques based on the type of the transaction associated with the transaction type identifier. The enterprise zone system may retrieve a first private key identifier from a database of private key identifiers based on the first decryption technique and the device identifier. The enterprise zone system may communicate the first private key identifier and the encrypted transaction data to a key vault. The enterprise zone system may receive decrypted transaction data associated with the transaction from the key vault. The enterprise zone system may communicate first transaction data based on the decrypted transaction data to the perimeter zone system. The perimeter zone system may communicate the first transaction data based on the decrypted transaction data to the first computing device.

In some non-limiting embodiments, the at least one device may include at least one transaction terminal.

In some non-limiting embodiments, the key vault may include at least one hardware security module (HSM). Additionally or alternatively, the HSM may receive the first private key identifier and the encrypted transaction data, determine a first private key based on the first private key identifier, decrypt the encrypted transaction data using the first private key to form the decrypted transaction data, and/or communicate the decrypted transaction data.

In some non-limiting embodiments, the first transaction data may include the decrypted transaction data.

In some non-limiting embodiments, the enterprise zone system may encrypt the decrypted transaction data using a second public key to form the first transaction data. Additionally or alternatively, the second public key may be associated with the at least one device associated with the device identifier.

According to non-limiting embodiments, provided is a computer program product for secure decryption. The computer program product may include at least one non-transitory computer-readable medium including one or more instructions that, when executed by at least one processor, cause the at least one processor to receive encrypted transaction data associated with a transaction from a first computing device. The encrypted transaction data may be encrypted using a first public key. The encrypted transaction data may include a transaction type identifier associated with a type of the transaction and a device identifier associated with at least one device associated with the transaction. A first decryption technique may be selected from a plurality of decryption techniques based on the type of the transaction associated with the transaction type identifier. A first private key identifier may be retrieved from a database of private key identifiers based on the first decryption technique and the device identifier. The first private key identifier and the encrypted transaction data may be communicated to a key vault. Decrypted transaction data associated with the transaction may be received from the key vault. First transaction data based on the decrypted transaction data may be communicated to the first computing device.

In some non-limiting embodiments, the at least one device may include at least one transaction terminal.

In some non-limiting embodiments, the key vault may include at least one hardware security module (HSM). Additionally or alternatively, the HSM may receive the first private key identifier and the encrypted transaction data, determine a first private key based on the first private key identifier, decrypt the encrypted transaction data using the first private key to form the decrypted transaction data, and/or communicate the decrypted transaction data.

In some non-limiting embodiments, the first transaction data may include the decrypted transaction data.

In some non-limiting embodiments, the decrypted transaction data may be encrypted using a second public key to form the first transaction data. Additionally or alternatively, the second public key may be associated with the at least one device associated with the device identifier.

Further embodiments are set forth in the following numbered clauses:

Clause 1: A computer-implemented method, comprising: receiving, with at least one processor, encrypted transaction data associated with a transaction from a first computing device, the encrypted transaction data encrypted using a first public key, the encrypted transaction data comprising a transaction type identifier associated with a type of the transaction and a device identifier associated with at least one device associated with the transaction; selecting, with at least one processor, a first decryption technique from a plurality of decryption techniques based on the type of the transaction associated with the transaction type identifier; retrieving, with at least one processor, a first private key identifier from a database of private key identifiers based on the first decryption technique and the device identifier; communicating, with at least one processor, the first private key identifier and the encrypted transaction data to a key vault; receiving, with at least one processor, decrypted transaction data associated with the transaction from the key vault; and communicating, with at least one processor, first transaction data based on the decrypted transaction data to the first computing device.

Clause 2: The method of clause 1, wherein the at least one device comprises at least one transaction terminal.

Clause 3: The method of any preceding clause, wherein the key vault comprises at least one hardware security module (HSM).

Clause 4: The method of any preceding clause, wherein the HSM: receives the first private key identifier and the encrypted transaction data; determines a first private key based on the first private key identifier; decrypts the encrypted transaction data using the first private key to form the decrypted transaction data; and communicates the decrypted transaction data.

Clause 5: The method of any preceding clause, wherein the first transaction data comprises the decrypted transaction data.

Clause 6: The method of any preceding clause, further comprising: encrypting, with at least one processor, the decrypted transaction data using a second public key to form the first transaction data, the second public key associated with the at least one device associated with the device identifier.

Clause 7: A system, comprising: a perimeter zone system configured to receive encrypted transaction data associated with a transaction from a first computing device, the encrypted transaction data encrypted using a first public key, the encrypted transaction data comprising a transaction type identifier associated with a type of the transaction and a device identifier associated with at least one device associated with the transaction, the perimeter zone system configured to communicate the encrypted transaction data to an enterprise zone system; the enterprise zone system configured to: select a first decryption technique from a plurality of decryption techniques based on the type of the transaction associated with the transaction type identifier; retrieve a first private key identifier from a database of private key identifiers based on the first decryption technique and the device identifier; communicate the first private key identifier and the encrypted transaction data to a key vault; receive decrypted transaction data associated with the transaction from the key vault; and communicate first transaction data based on the decrypted transaction data to the perimeter zone system, wherein the perimeter zone system is further configured to communicate the first transaction data based on the decrypted transaction data to the first computing device.

Clause 8: The system of clause 7, wherein the at least one device comprises at least one transaction terminal.

Clause 9: The system of clauses 7 or 8, wherein the key vault comprises at least one hardware security module (HSM).

Clause 10: The system of any one of clauses 7-9, wherein the HSM is configured to: receive the first private key identifier and the encrypted transaction data from the enterprise zone system; determine a first private key based on the first private key identifier; decrypt the encrypted transaction data using the first private key to form the decrypted transaction data; and communicate the decrypted transaction data to the enterprise zone system.

Clause 11: The system of any one of clauses 7-10, wherein the first transaction data comprises the decrypted transaction data.

Clause 12: The system of any one of clauses 7-11, wherein the enterprise zone system is further configured to: encrypt the decrypted transaction data using a second public key to form the first transaction data, the second public key associated with the at least one device associated with the device identifier.

Clause 13: A computer program product comprising at least one non-transitory computer-readable medium including one or more instructions that, when executed by at least one processor, cause the at least one processor to: receive encrypted transaction data associated with a transaction from a first computing device, the encrypted transaction data encrypted using a first public key, the encrypted transaction data comprising a transaction type identifier associated with a type of the transaction and a device identifier associated with at least one device associated with the transaction; select a first decryption technique from a plurality of decryption techniques based on the type of the transaction associated with the transaction type identifier; retrieve a first private key identifier from a database of private key identifiers based on the first decryption technique and the device identifier; communicate the first private key identifier and the encrypted transaction data to a key vault; receive decrypted transaction data associated with the transaction from the key vault; and communicate first transaction data based on the decrypted transaction data to the first computing device.

Clause 14: The computer program product of clause 13, wherein the at least one device comprises at least one transaction terminal.

Clause 15: The computer program product of clauses 13 or 14, wherein the key vault comprises at least one hardware security module (HSM).

Clause 16: The computer program product of any one of clauses 13-15, wherein the HSM: receives the first private key identifier and the encrypted transaction data; determines a first private key based on the first private key identifier; decrypts the encrypted transaction data using the first private key to form the decrypted transaction data; and communicates the decrypted transaction data.

Clause 17: The computer program product of any one of clauses 13-16, wherein the first transaction data comprises the decrypted transaction data.

Clause 18: The computer program product of any one of clauses 13-17, further comprising: encrypting the decrypted transaction data using a second public key to form the first transaction data, the second public key associated with the at least one device associated with the device identifier.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1:
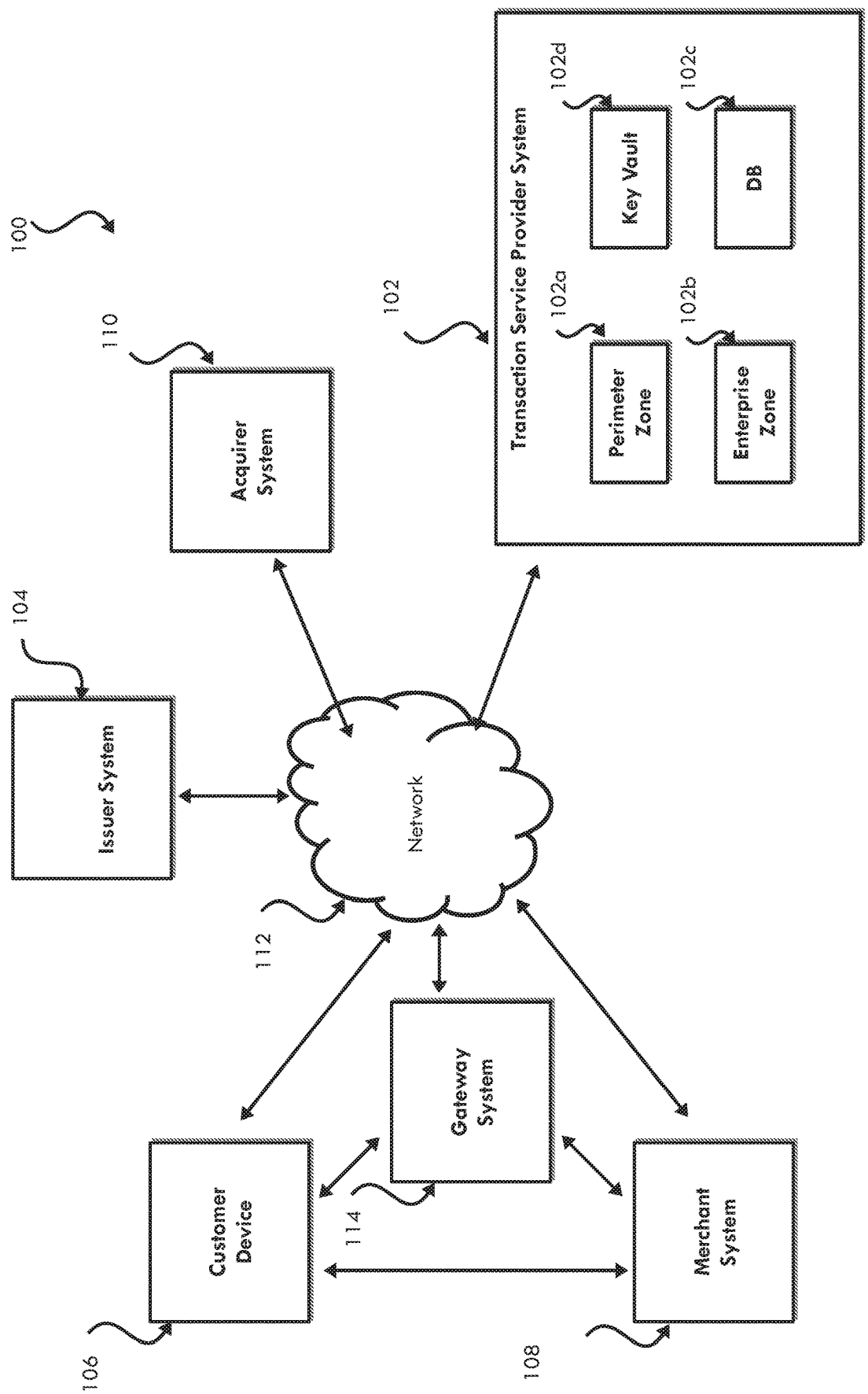
FIG. 1 is a diagram of a non-limiting embodiment of an environment in which systems, methods, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a payment token, and/or the like). In some non-limiting embodiments, an issuer institution may provide an account identifier (e.g., a PAN, a payment token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments, a payment token may be "format preserving" and may have a numeric format that conforms to the account identifiers used in existing payment processing networks (e.g., ISO 8583 financial transaction message format). In some non-limiting embodiments, a payment token may be used in place of a PAN to initiate, authorize, settle, or resolve a payment transaction or represent the original credential in other systems where the original credential would typically be provided. In some non-limiting embodiments, a token value may be generated such that the recovery of the original PAN or other account identifier from the token value may not be computationally derived (e.g., with a one-way hash or other cryptographic function). Further, in some non-limiting embodiments, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments, a requestor may interface with a network token system through any suitable communication network and/or protocol (e.g., using HTTPS, SOAP and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments, token requestor identifiers may be revoked and/or token requestors may be assigned new token requestor identifiers. In some non-limiting embodiments, this information may be subject to reporting and audit by the token service provider.

As used herein, the term "token service provider" may refer to an entity including one or more server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments, the token service provider may have the ability to set aside licensed BINs as token BINs to issue tokens for the PANs that may be submitted to the token service provider. In some non-limiting embodiments, various entities of a tokenization ecosystem may assume the roles of the token service provider. For example, payment networks and issuers or their agents may become the token service provider by implementing the token services according to non-limiting embodiments of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments, the token vault may be a part of a token service system. For example, the token vault may be provided as a part of the token service provider. Additionally or alternatively, the token vault may be a remote repository accessible by the token service provider. In some non-limiting embodiments, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, the term "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. As used herein, the term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the disclosed subject matter are directed to methods, systems, and computer program products for secure decryption, including, but not limited to, secure decryption using a centralized key vault. For example, non-limiting embodiments of the disclosed subject matter provide receiving (e.g., at a centralized system) encrypted transaction data that is at least partially encrypted with a first public key and includes a transaction type identifier and/or device identifier, which may be used to select a decryption technique from a plurality of such techniques and/or retrieve a private key identifier (e.g., from a database) that may be communicated to a key vault to decrypt the encrypted transaction data. Such embodiments provide techniques and systems that allow many cryptographic keys (e.g., the majority of cryptographic keys deployed among the entities associated with the network, the most sensitive keys (e.g., secret keys, private keys, and/or the like) deployed among the entities associated with the network, and/or the like) at a single, centralized system. As such, the burden of maintaining and/or deploying such cryptographic keys at individual entities may be reduced (e.g., decreased, eliminated, and/or the like), since many of the cryptographic keys are maintained at the single, centralized system. Additionally, the security risks associated with maintaining cryptographic keys at multiple entities and/or deploying the cryptographic keys among such entities may be reduced (e.g., decreased, eliminated, and/or the like) since many of the cryptographic keys are maintained at the single, centralized system and not communicated between the entities. In addition, the activities each of the entities in the network may be accurately determined and/or monitored, since all transaction messages may be communicated to and/or received at the single, centralized system, which may be the only entity in possession of certain cryptographic keys needed to decrypt the transaction messages, thus reducing (e.g., decreasing, preventing, eliminating, and/or the like) decryption of such transaction messages by other entities in an impermissible manner (e.g., in contravention of requirements, security standards, regulations, agreements, and/or the like).

For the purpose of illustration, in the following description, while the presently disclosed subject matter is described with respect to systems, methods, and computer program products for secure decryption, e.g., using a centralized key vault, one skilled in the art will recognize that the disclosed subject matter is not limited to the illustrative embodiments. For example, the methods, systems, and computer program products described herein may be used with a wide variety of settings, such as secure decryption in any suitable setting, e.g., contactless payment transactions (e.g., via NFC receivers, RFID receivers, other contactless transceivers or receivers, and/or the like), card-present payment transactions (e.g., via a POS system at a location of a merchant), online payment transactions (e.g., via a website of a merchant on the Internet), interactions with electronic content (e.g., via a website, a search engine, a mobile application, and/or the like), and/or the like.

Referring now to FIG. 1, FIG. 1 is a diagram of a non-limiting embodiment of an environment 100 in which systems, products, and/or methods, as described herein, may be implemented. As shown in FIG. 1, environment 100 may include transaction service provider system 102, perimeter zone system 102a, enterprise zone system 102b, database 102c, key vault 102d, issuer system 104, customer device 106, merchant system 108, acquirer system 110, gateway system 114, and/or network 112.

Transaction service provider system 102 may include one or more devices capable of receiving information from and/or communicating information to issuer system 104, customer device 106, merchant system 108, acquirer system 110, and/or gateway system 114 via network 112. For example, transaction service provider system 102 may include a computing device, such as a server (e.g., a transaction processing server), a group of servers, and/or other like devices. In some non-limiting embodiments, transaction service provider system 102 may be associated with a transaction service provider, as described herein. In some non-limiting embodiments, transaction service provider system 102 may be in communication with a data storage device, which may be local or remote to transaction service provider system 102. In some non-limiting embodiments, transaction service provider system 102 may be capable of receiving information from, storing information in, communicating information to, or searching information stored in the data storage device. In some non-limiting embodiments, transaction service provider system 102 may include perimeter zone system 102a, enterprise zone system 102b, database 102c, key vault 102d, any combination thereof, and/or the like.

In some non-limiting embodiments, perimeter zone system 102a may include one or more devices capable of receiving information from and/or communicating information to issuer system 104, customer device 106, merchant system 108, acquirer system 110, and/or gateway system 114 via network 112. For example, perimeter zone system 102a may include a computing device, such as a server, a group of servers, and/or other like devices. In some non-limiting embodiments, perimeter zone system 102a may be a part of transaction service provider system 102. Additionally or alternatively, perimeter zone system 102a may be associated with a transaction service provider, as described herein. In some non-limiting embodiments, perimeter zone system 102a may include a physical or logical subsystem (e.g., of transaction service provider system 102 and/or the like) that includes and/or exposes external-facing services (e.g., applications and/or the like) to systems and/or devices in communication therewith over network 112 (e.g., issuer system 104, customer device 106, merchant system 108, acquirer system 110, and/or gateway system 114). Additionally or alternatively, perimeter zone system 102a may include at least one application programming interface (API) to enable communication between transaction service provider system 102 (and/or external-facing services thereof) and external systems and/or devices (e.g., issuer system 104, customer device 106, merchant system 108, acquirer system 110, and/or gateway system 114). In some non-limiting embodiments, perimeter zone system 102a may include one or more devices capable of receiving information from and/or communicating information to enterprise zone 402b (e.g., via a local area network, private network, virtual private network, and/or the like). Additionally or alternatively, at least one firewall (e.g., a first firewall) may separate perimeter zone system 102a from enterprise zone 102b and/or allow communication between perimeter zone system 102a and enterprise zone 102b.

In some non-limiting embodiments, enterprise zone system 102b may include one or more devices capable of receiving information from and/or communicating information to perimeter zone system 102a, database 102c, and/or key vault 402d (e.g., via a local area network, private network, virtual private network, and/or the like). For example, enterprise zone system 102b may include a computing device, such as a server, a group of servers, and/or other like devices. In some non-limiting embodiments, enterprise zone system 102b may be a part of transaction service provider system 102. Additionally or alternatively, enterprise zone system 102b may be associated with a transaction service provider, as described herein. In some non-limiting embodiments, enterprise zone system 102b may include a physical or logical subsystem (e.g., of transaction service provider system 102 and/or the like) that includes internal services (e.g., applications and/or the like), e.g., for use by transaction service provider system 102, users thereof, and/or the like. In some non-limiting embodiments, at least one firewall (e.g., the first firewall) may separate perimeter zone system 102a from enterprise zone 102b and/or allow communication between perimeter zone system 102a and enterprise zone 102b. In some non-limiting embodiments, at least one firewall (e.g., a second firewall) may separate enterprise zone 102b from database 102c and/or allow communication between enterprise zone 102b and database 102c. In some non-limiting embodiments, at least one firewall (e.g., the second firewall, a third firewall, and/or the like) may separate enterprise zone 102b from key vault 102d and/or allow communication between enterprise zone 102b and key vault 102d.

In some non-limiting embodiments, database 102c may include one or more devices capable of receiving information from and/or communicating information to enterprise zone system 102b (e.g., via a local area network, private network, virtual private network, and/or the like). For example, database 102c may include a computing device, such as a server, a group of servers, and/or the like. In some non-limiting embodiments, database 102c may be include a data storage device. In some non-limiting embodiments, database 102c may be capable of storing information in, communicating information from, or searching information stored in the data storage device. In some non-limiting embodiments, database 102c may store a plurality of private key identifiers, as described herein. Additionally or alternatively, database 102c may store a mapping from device identifiers and/or decryption techniques to the plurality of private key identifiers, as described herein. In some non-limiting embodiments, database 102c may be a part of transaction service provider system 102. Additionally or alternatively, database 102c may be associated with a transaction service provider, as described herein. In some non-limiting embodiments, database 102c may be included in a physical or logical subsystem (e.g., of transaction service provider system 102 and/or the like), e.g., a restricted zone (sub-)system, which may include sensitive data (e.g., private key identifiers, mapping(s) from device identifiers and/or decryption techniques to the plurality of private key identifiers, and/or the like). In some non-limiting embodiments, at least one firewall (e.g., the second firewall) may separate enterprise zone 102b from database 102c and/or allow communication between enterprise zone 102b and database 102c.

In some non-limiting embodiments, key vault 102d may include one or more devices capable of receiving information from and/or communicating information to enterprise zone system 102b (e.g., via a local area network, private network, virtual private network, and/or the like). For example, key vault 102d may include a computing device, such as a server, a group of servers, a hardware security module (HSM), a group of HSMs, and/or the like. In some non-limiting embodiments, key vault 102d may include a repository that maintains private keys, mappings of private key identifiers to private keys, and/or the like. Additionally or alternatively, key vault 102d (e.g., HSM(s) thereof) may implement at least one cryptographic technique (e.g., encryption, decryption, re-encryption, and/or the like), as described herein. In some non-limiting embodiments, key vault 102d may be a part of transaction service provider system 102. Additionally or alternatively, key vault 102d may be associated with a transaction service provider, as described herein. In some non-limiting embodiments, key vault 102d may be included in a physical or logical subsystem (e.g., of transaction service provider system 102 and/or the like), e.g., a restricted zone (sub-)system, which may include sensitive data (e.g., private keys, mappings of private key identifiers to private keys, and/or the like, implementations of decryption techniques, HSM(s), and/or the like). In some non-limiting embodiments, at least one firewall (e.g., the second firewall, the third firewall, and/or the like) may separate enterprise zone 102b from key vault 102d and/or allow communication between enterprise zone 102b and key vault 102d.

Issuer system 104 may include one or more devices capable of receiving information and/or communicating information to transaction service provider system 102, customer device 106, merchant system 108, acquirer system 110, and/or gateway system 114 via network 112. For example, issuer system 104 may include a computing device, such as a server, a group of servers, and/or other like devices. In some non-limiting embodiments, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, acquirer system 110, and/or gateway system 114 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, acquirer system 110, and/or gateway system 114 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments, merchant system 108 may include a computing device, such as a server, a group of servers, a client device, a group of client devices, and/or other like devices. In some non-limiting embodiments, merchant system 108 may be associated with a merchant as described herein. In some non-limiting embodiments, merchant system 108 may include one or more client devices. For example, merchant system 108 may include a client device that allows a merchant to communicate information to transaction service provider system 102. In some non-limiting embodiments, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, merchant system 108, and/or gateway system 114 via network 112. For example, acquirer system 110 may include a computing device, a server, a group of servers, and/or the like. In some non-limiting embodiments, acquirer system 110 may be associated with an acquirer as described herein.

Gateway system 114 may include one or more devices capable of receiving information from and/or communicating information to transaction service provider system 102, issuer system 104, customer device 106, merchant system 108, and/or acquirer system 110 via network 112. For example, gateway system 114 may include a computing device, such as a server, a group of servers, and/or other like devices. In some non-limiting embodiments, gateway system 114 may be associated with a payment gateway, as described herein. Additionally or alternatively, gateway system 114 may include and/or be a party of a payment gateway system, as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
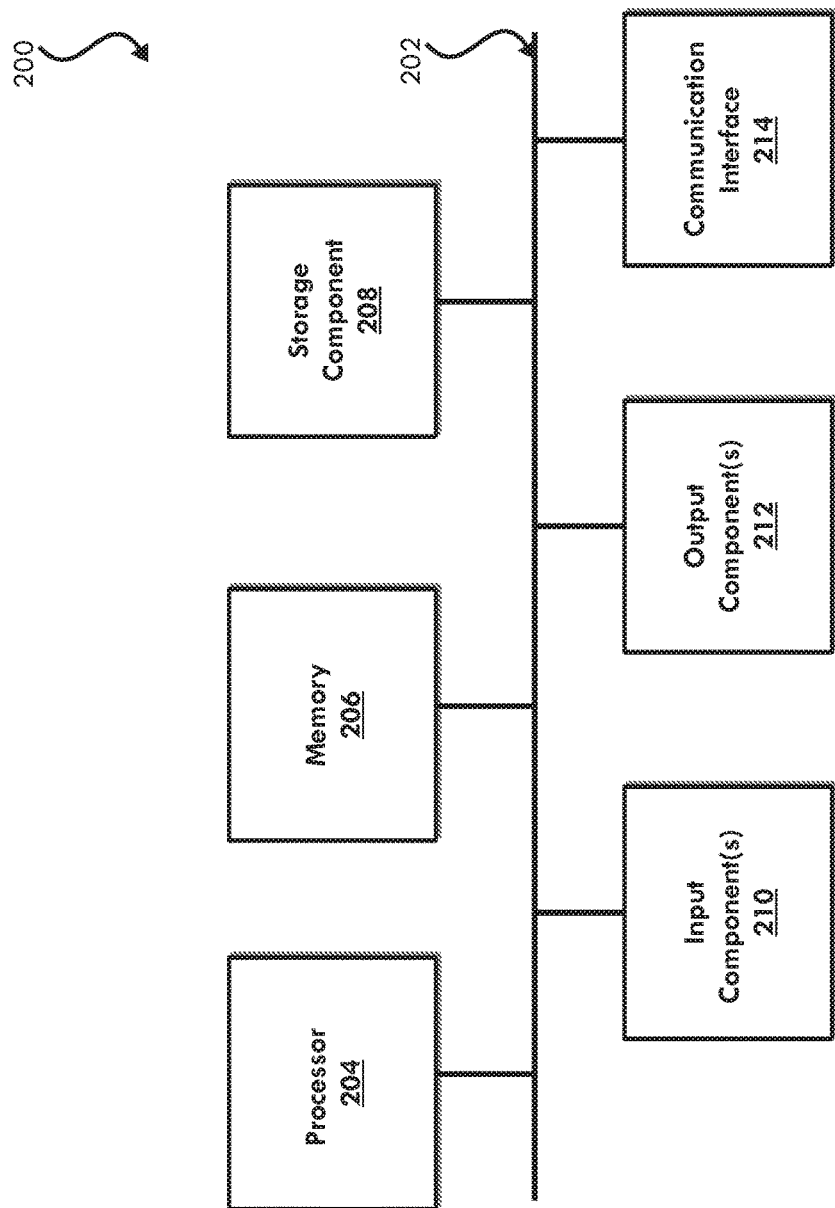
FIG. 2 is a diagram of a non-limiting embodiment of components of one or more devices of FIG. 1.

Referring now to FIG. 2, FIG. 2 is a diagram of example components of a device 200. Device 200 may correspond to one or more devices of transaction service provider system 102, perimeter zone system 102a, enterprise zone system 102b, database 102c, key vault 102d, issuer system 104, customer device 106, merchant system 108, and/or acquirer system 110. In some non-limiting embodiments, transaction service provider system 102, perimeter zone system 102a, enterprise zone system 102b, database 102c, key vault 102d, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component(s) 210, output component(s) 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component(s) 210 may include a component that permits device 200 to receive information, such as via user input (e.g., a touch screen display, a keyboard, a keypad, a mouse, a button, a switch, a microphone, a camera, and/or the like). Additionally or alternatively, input component(s) 210 may include a sensor for sensing information (e.g., a global positioning system (GPS) component, an accelerometer, a gyroscope, an actuator, and/or the like). Output component(s) 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
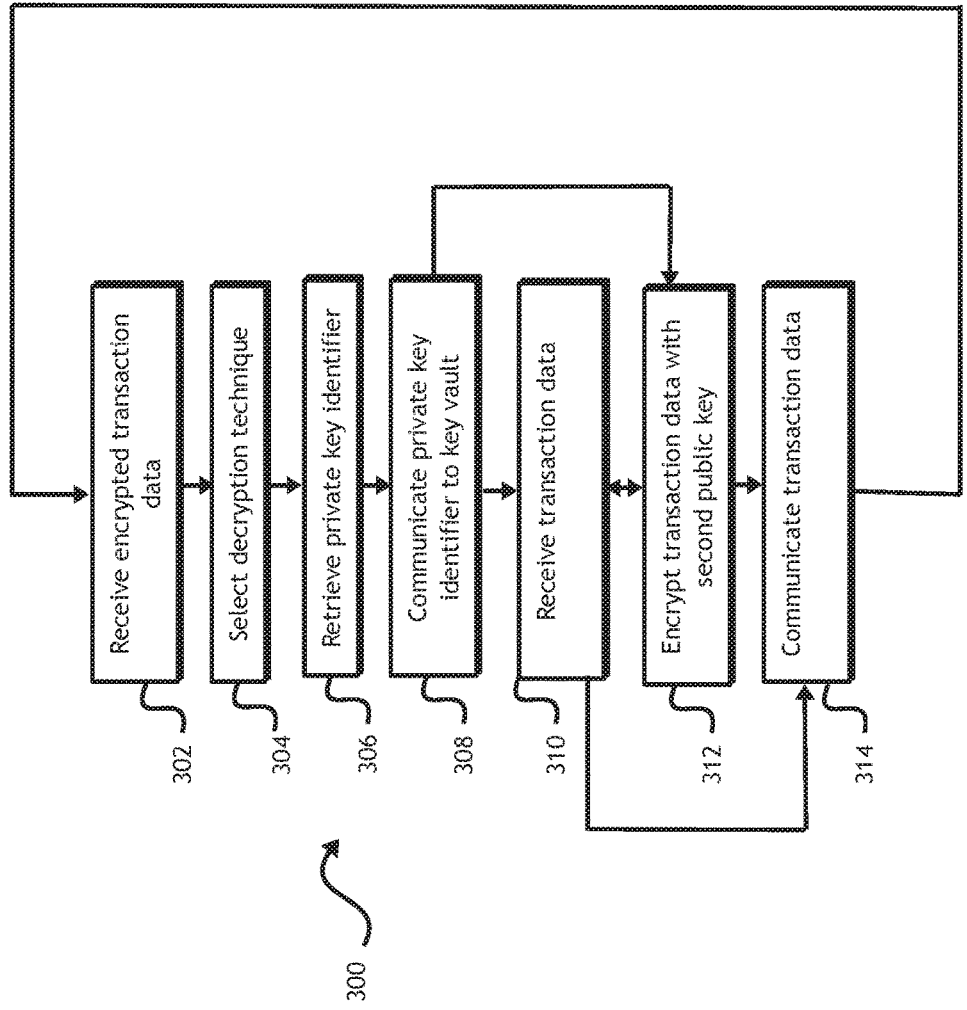
FIG. 3 is a flowchart of a non-limiting embodiment of a process for secure decryption, according to the principles of the presently disclosed subject matter.

Referring now to FIG. 3, FIG. 3 is a flowchart of a non-limiting embodiment of a process 300 for secure decryption. In some non-limiting embodiments, one or more of the steps of process 300 may be performed (e.g., completely, partially, and/or the like) by transaction service provider system 102 (e.g., perimeter zone system 102*a*, enterprise zone system 102*b*, database 102*c*, and/or key vault 102*d* thereof). In some non-limiting embodiments, one or more of the steps of process 300 may be performed (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), acquirer system 110 (e.g., one or more devices of acquirer system 110), gateway system 114 (e.g., one or more devices of gateway system 114), and/or the like. In some non-limiting embodiments, a centralized system may be implemented (e.g., completely, partially, and/or the like) by transaction service provider system 102 (e.g., perimeter zone system 102*a*, enterprise zone system 102*b*, database 102*c*, and/or key vault 102*d* thereof). In some non-limiting embodiments, a first computing device may be implemented (e.g., completely, partially, and/or the like) by a system and/or device in communication with transaction service provider system 102, such as issuer system 104 (e.g., one or more devices of issuer system 104), customer device 106, merchant system 108 (e.g., one or more devices of merchant system 108), acquirer system 110 (e.g., one or more devices of acquirer system 110), gateway system 114 (e.g., one or more devices of gateway system 114), and/or the like.

As shown in FIG. 3, at step 302, process 300 may include receiving encrypted transaction data. For example, transaction service provider system 102 (e.g., perimeter zone system 102*a* thereof) may receive encrypted transaction data associated with a transaction from a first computing device (e.g., issuer system 104, customer device 106, merchant system 108 acquirer system 110, gateway system 114, and/or the like). In some non-limiting embodiments, the encrypted transaction data may be at least partially encrypted using a first public key. Additionally or alternatively, the encrypted transaction data may include a transaction type identifier associated with a type of the transaction, a device identifier associated with at least one device associated with the transaction, a merchant identifier associated with a merchant associated with the transaction, a gateway identifier associated with a gateway associated with the transaction, any combination thereof, and/or the like. In some non-limiting embodiments, at least some of the identifiers (e.g., transaction type identifier, device identifier, merchant identifier, gateway identifier, any combination thereof, and/or the like) may not be encrypted.

In some non-limiting embodiments, the transaction type may include magnetic stripe reader (MSR), smart card (e.g., integrated circuit (IC) card, EMV® card, and/or the like), contactless (e.g., near-field communication (NFC), radio frequency identification (RFID), cellular phone, smart phone, mobile device, wearable device, Google Pay®, Android Pay®, Apple Pay®, Samsung Pay®, payWave®, and/or the like), card-not-present (CNP), e-commerce (e.g., Visa® Checkout), debit (e.g., with a personal identification number (PIN)), any combination thereof, and/or the like.

In some non-limiting embodiments, the device(s) associated with the device identifier may include at least one transaction terminal (e.g., POS device of merchant system 108 and/or the like). Additionally or alternatively, the device(s) associated with the device identifier may include issuer system 104 (e.g., at least one device of issuer system 104), customer device 106, acquirer system 110 (e.g., at least one device of acquirer system 110), gateway system 114 (e.g., at least one device of gateway system 114), and/or the like.

In some non-limiting embodiments, perimeter zone system 102*a* may receive the encrypted transaction data (e.g., from the first computing device). In some non-limiting embodiments, perimeter zone system 102*a* may include at least one API. For example, the API(s) may be made available to the public (e.g., other entities such as issuer system 104, customer device 106, merchant system 108, acquirer system 110, gateway system 114, and/or the like). In some non-limiting embodiments, the first computing device (e.g., issuer system 104, customer device 106, merchant system 108, acquirer system 110, gateway system 114, and/or the like) may call (e.g., send a decryption request to) perimeter zone system 102*a* using the API(s) associated with the transaction type.

In some non-limiting embodiments, the first computing device (e.g., issuer system 104, customer device 106, merchant system 108, acquirer system 110, gateway system 114, and/or the like) may be on-boarded with transaction service provider system 102 (e.g., perimeter zone system 102*a* thereof). For example, the first computing device may call the perimeter zone system 102*a* (e.g., communicate to perimeter zone system 102*a* via the API(s)) to register at least one transaction type (e.g., identify at least one transaction type with a transaction type identifier). Additionally or alternatively, perimeter zone system 102*a* may enable the first computing device for that transaction type (e.g., register and/or store a device identifier, merchant identifier, gateway identifier, and/or the like associated with the first computing device in database 102*c* via enterprise zone system 102*b*) and/or communicate a public key to the first computing device (e.g., to use for encrypting the transaction data to form encrypted transaction data, as described herein).

In some non-limiting embodiments, a plurality of computing devices may be on-boarded as part of a family (e.g., group and/or the like) of devices (e.g., transaction terminals, such as POS devices of merchant system 108 and/or the like). For example, (e.g., issuer system 104, customer device 106, merchant system 108, acquirer system 110, gateway system 114, and/or the like) may be on-boarded with transaction service provider system 102 (e.g., perimeter zone system 102a thereof). For example, the first computing device may call the perimeter zone system 102a (e.g., communicate to perimeter zone system 102a via the API(s)) to register at least one transaction type (e.g., identify at least one transaction type with a transaction type identifier) for the plurality of devices (e.g., identify the devices with at least one device identifier associated with at least one of the devices). Additionally or alternatively, perimeter zone system 102a may enable the plurality of devices for that transaction type (e.g., register and/or store the device identifier(s) associated with the plurality of devices in database 102c via enterprise zone system 102b) and/or communicate at least one public key to the first computing device (e.g., for use by the plurality of devices and/or by the first computing device for encrypting the transaction data to form encrypted transaction data, as described herein). In some non-limiting embodiments, the device identifier(s) may include at least a portion of a serial number of such device(s) (e.g., the first 10 characters of a key serial number of each device and/or the like).

In some non-limiting embodiments, transaction service provider system 102 (e.g., perimeter zone system 102a, enterprise zone system 102b, and/or the like) may generate a base derivation key (BDK) (e.g., in key vault 102d and/or the like). For example, the BDK may be based on the device identifier (e.g., key serial number, a portion thereof, and/or the like). Additionally or alternatively, transaction service provider system 102 (e.g., perimeter zone system 102a, enterprise zone system 102b, and/or the like) may divide (e.g., segment, split, and/or the like) the BDK into a plurality of components (e.g., three components). In some non-limiting embodiments, each of the components may be communicated to a respective key custodian of a plurality of key custodians (e.g., three key custodians). Additionally or alternatively, the key custodian(s) may inject (e.g., communicate, install, and/or the like) the components of the BDK into the registered device(s). In some non-limiting embodiments, transaction service provider system 102 (e.g., perimeter zone system 102a, enterprise zone system 102b, and/or the like) may inject (e.g., communicate, install, and/or the like) the BDK into key vault 102d and/or store (e.g., communicate, write, and/or the like) a private key identifier associated with the BDK in database 102c. In some non-limiting embodiments, the first public key may be the BDK, may be based on the BDK, and/or the like. Additionally or alternatively, the registered computing device(s) (e.g., the first computing device and/or the like) may use the public key to encrypt the transaction data (e.g., a payload thereof, a portion thereof excluding the at least some of the identifiers, and/or the like), to form the encrypted transaction data. In some non-limiting embodiments, the registered computing device(s) (e.g., the first computing device and/or the like) may communicate the encrypted transaction data to transaction service provider system 102 (e.g., to perimeter zone system 102a thereof via an API call for requesting decryption of the transaction data).

In some non-limiting embodiments, transaction service provider system 102 (e.g., perimeter zone system 102a, enterprise zone system 102b, and/or the like) may generate a public-private key pair (e.g., a first key pair including the first public key and a first private key associated with the first public key). In some non-limiting embodiments, transaction service provider system 102 (e.g., perimeter zone system 102a, enterprise zone system 102b, and/or the like) may inject (e.g., communicate, install, and/or the like) the private key (e.g., first private key) into key vault 102d and/or store (e.g., communicate, write, and/or the like) a private key identifier associated with the private key (e.g., first private key) in database 102c. Additionally or alternatively, transaction service provider system 102 (e.g., perimeter zone system 102a) may communicate the public key (e.g., first public key) to the registered computing device(s) (e.g., first computing device(s) and/or the like). In some non-limiting embodiments, the registered computing device(s) (e.g., the first computing device and/or the like) may use the public key to encrypt the transaction data (e.g., a payload thereof, a portion thereof excluding the at least some of the identifiers, and/or the like) to form the encrypted transaction data. In some non-limiting embodiments, the registered computing device(s) (e.g., the first computing device and/or the like) may communicate the encrypted transaction data to transaction service provider system 102 (e.g., to perimeter zone system 102a thereof via an API call for requesting decryption of the transaction data).

As shown in FIG. 3, at step 304, process 300 may include selecting a decryption technique. For example, transaction service provider system 102 (e.g., enterprise zone system 102b) may select a first decryption technique from a plurality of decryption techniques based on the type of the transaction associated with the transaction type identifier.

In some non-limiting embodiments, the plurality of decryption techniques may include a private key (e.g., first private keys associated with the first public key), a session key, a symmetric key, a derived unique key per transaction (DUKPT), an elliptic-curve Diffie-Hellman (ECDH) key, a decryption technique associated with a transaction type (e.g., MSR, smart card (e.g., EMV® card and/or the like), contactless (e.g., NFC, Google Pay®, Android Pay®, Apple Pay®, Samsung Pay®, payWave®, and/or the like), CNP, e-commerce (e.g., Visa® Checkout), debit (e.g., with a PIN), and/or the like), and/or the like. For example, each type of the transaction (e.g., associated with a respective transaction type identifier) may be associated with a respective one of the aforementioned decryption techniques.

As shown in FIG. 3, at step 306, process 300 may include retrieving a private key identifier. For example, transaction service provider system 102 (e.g., enterprise zone system 102b) may retrieve a first private key identifier, e.g., from database 102c based on the first decryption technique, the device identifier, and/or the like. For example, database 102c may store a plurality of private key identifiers, as described herein. Additionally or alternatively, database 102c may store a mapping from device identifiers and/or decryption techniques to the plurality of private key identifiers.

In some non-limiting embodiments, each private key identifier may include a hash of the respective private key associated therewith. For example, each hash may be unique to the respective private key. Additionally or alternatively, each private key may be unique to a registered computing device and/or entity in control thereof.

In some non-limiting embodiments, enterprise zone system 102b may search for the (first) private key identifier (e.g., (first) hash) in database 102c based on the type of transaction associated with the transaction type identifier, the first decryption technique, the device(s) associated with the device identifier, and/or the like.

In some non-limiting embodiments, the device identifier may be associated with at least a portion of a key serial number (e.g., of a registered device, group of devices, and/or the like), as described herein. Additionally or alternatively, enterprise zone system 102b may retrieve a private key identifier associated with a BDK associated with the registered device(s) from database 102c. In some non-limiting embodiments, the group of devices may share the same secret key (e.g., the same BDK).

As shown in FIG. 3, at step 308, process 300 may include communicating the private key identifier to the key vault. For example, transaction service provider system 102 (e.g., enterprise zone system 102b) may communicate the first private key identifier and the encrypted transaction data to key vault 102d.

In some non-limiting embodiments, key vault 102d may include at least one HSM. Additionally or alternatively, key vault 102d (and/or at least one HSM thereof) may receive the first private key identifier and the encrypted transaction data. In some non-limiting embodiments, key vault 102d (and/or at least one HSM thereof) may determine a first private key based on the first private key identifier. Additionally or alternatively, key vault 102d (and/or at least one HSM thereof) may decrypt the encrypted transaction data using the first private key to form the decrypted transaction data. In some non-limiting embodiments, key vault 102d may communicate the decrypted transaction data (e.g., to enterprise zone system 102b and/or the like).

In some non-limiting embodiments, the (first) private key may be inaccessible to any system, device, and/or component thereof except key vault 102d. Additionally or alternatively, no device, component, sub-system, and/or the like of transaction service provider system 102 (including but not limited to enterprise zone system 102b) may see (e.g., have access to and/or the like) the (first) private key (e.g., in clear text and/or the like) except key vault 102d. In some non-limiting embodiments, key vault 102d (e.g., HSM(s) thereof) to never release (e.g., communicate, provide access to, and/or the like) the private keys stored therein.

In some non-limiting embodiments, each private key may be divided (e.g., segmented, split, and/or the like) into a plurality of components (e.g., three components). Additionally or alternatively, at least one key custodians (e.g., three key custodians) may inject (e.g., communicate, install, and/or the like) the private key (e.g., the components thereof) into key vault 102d (e.g., HSM(s) thereof). In some non-limiting embodiments, key vault 102d (e.g., HSM(s) thereof) to never release (e.g., communicate, provide access to, and/or the like) the private keys stored therein.

As shown in FIG. 3, at step 310, process 300 may include receiving transaction data. For example, transaction service provider system 102 (e.g., enterprise zone system 102b) may receive transaction data (e.g., decrypted transaction data, re-encrypted transaction data, and/or the like) associated with the transaction from the key vault.

In some non-limiting embodiments, enterprise zone system 102b may receive a response from key vault 102d including decrypted transaction data.

In some non-limiting embodiments, enterprise zone system 102b may receive a response from key vault 102d including the first transaction data associated with the transaction. For example, decrypted transaction data may be encrypted (e.g., re-encrypted) with a second public key to form the first transaction data (e.g., by key vault 102d, as further described below).

As shown in FIG. 3, at step 312, process 300 may include encrypting transaction data with a second public key. For example, transaction service provider system 102 (e.g., perimeter zone system 102a, enterprise zone system 102b, and/or key vault 102) may encrypt the decrypted transaction data using a second public key to form first transaction data associated with the transaction data. In some non-limiting embodiments, the second public key may be associated with the device(s) associated with the device identifier.

In some non-limiting embodiments, perimeter zone system 102a and/or enterprise zone system 102b may store the second public key. Additionally or alternatively, the device(s) associated with the device identifier may store a second private key associated with the second public key. Additionally or alternatively, perimeter zone system 102a and/or enterprise zone system 102b may encrypt the decrypted transaction data with the second public key to form the first transaction data. In some non-limiting embodiments, the device(s) associated with the device identifier may be able to decrypt the first transaction data using the second private key.

In some non-limiting embodiments, key vault 102d may store the second public key. Additionally or alternatively, the device(s) associated with the device identifier may store a second private key associated with the second public key. Additionally or alternatively, key vault 102d may encrypt the decrypted transaction data with the second public key to form the first transaction data (e.g., before communicating the first transaction data to enterprise zone system 102b). In some non-limiting embodiments, the device(s) associated with the device identifier may be able to decrypt the first transaction data using the second private key.

In some non-limiting embodiments, although the device(s) associated with the device identifier may store the second private key, the burden of maintaining cryptographic keys by such devices may still be reduced since one private key is still less than multiple cryptographic keys (e.g., at least one key associated with each transaction type). Additionally, the security risks associated with maintaining cryptographic keys at such device(s) may still be reduced since the second private key may be unique to such device(s) and, therefore, may not compromise other systems, devices, and/or the like in communication therewith.

As shown in FIG. 3, at step 314, process 300 may include communicating the transaction data. For example, transaction service provider system 102 (e.g., perimeter zone system 102a) may communicate transaction data (e.g., decrypted transaction data, first transaction data associated therewith, and/or the like) to the first computing device.

In some non-limiting embodiments, perimeter zone system 102a may communicate the decrypted transaction data to the first computing device.

In some non-limiting embodiments, perimeter zone system 102a may communicate first transaction data associated with the decrypted transaction data (e.g., encrypted with the second public key and/or the like) to the first computing device.

Figure 4:
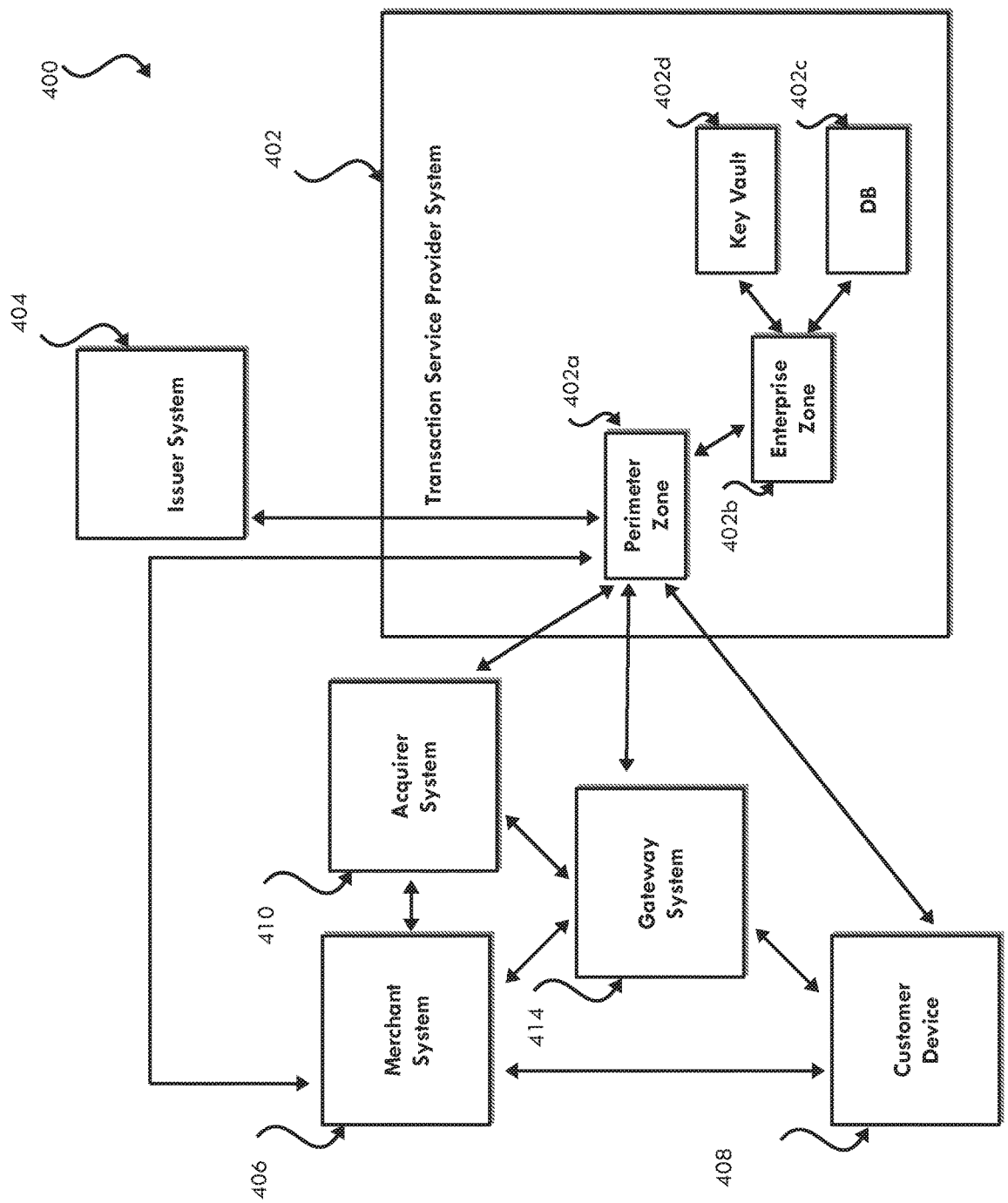
FIG. 4 is a diagram of a non-limiting embodiment of an implementation of a non-limiting embodiment of the process shown in FIG. 3 according to the principles of the presently disclosed subject matter.

Referring now to FIG. 4, FIG. 4 is a diagram of an exemplary implementation 400 of a non-limiting embodiment relating to process 300 shown in FIG. 3. As shown in FIG. 4, implementation 400 may include transaction service provider system 402, perimeter zone system 402a, enterprise zone system 402b, database 402c, key vault 402d, issuer system 404, customer device 406, merchant system 408, acquirer system 410, and/or gateway system 414. In some non-limiting embodiments, transaction service provider system 402 may be the same as or similar to transaction service provider system 102. In some non-limiting embodiments, perimeter zone system 402a may be the same as or similar to perimeter zone system 102a. In some non-limiting embodiments, enterprise zone system 402b may be the same as or similar to enterprise zone system 102b. In some non-limiting embodiments, database 402c may be the same as or similar to database 102c. In some non-limiting embodiments, key vault 402d may be the same as or similar to key vault 102d. In some non-limiting embodiments, issuer system 404 may be the same as or similar to issuer system 104. In some non-limiting embodiments, customer device 406 may be the same as or similar to customer device 106. In some non-limiting embodiments, merchant system 408 may be the same as or similar to merchant system 108. In some non-limiting embodiments, acquirer system 410 may be the same as or similar to acquirer system 110. In some non-limiting embodiments, gateway system 414 may be the same as or similar to gateway system 114. In some non-limiting embodiments, a centralized system may be implemented (e.g., completely, partially, and/or the like) by transaction service provider system 402 (e.g., perimeter zone system 402a, enterprise zone system 402b, database 402c, and/or key vault 402d thereof). In some non-limiting embodiments, a first computing device may be implemented (e.g., completely, partially, and/or the like) by a system and/or device in communication with transaction service provider system 402, such as issuer system 404 (e.g., one or more devices of issuer system 404), customer device 406, merchant system 408 (e.g., one or more devices of merchant system 408), acquirer system 410 (e.g., one or more devices of acquirer system 410), gateway system 414 (e.g., one or more devices of gateway system 414), and/or the like.

In some non-limiting embodiments, a first computing device may call (e.g., communicate with and/or the like) perimeter zone system 402a (e.g., via an API), as described herein. For example, the first computing device may communicate encrypted transaction data to service to perimeter zone system 402a (e.g., via an API), e.g., to request decryption of a payload of the encrypted transaction data (e.g., based on transaction type), as described herein.

In some non-limiting embodiments, perimeter zone system 402a may determine (e.g., identify and/or the like) the type of transaction to be processed (e.g., based on a transaction type identifier included with the transaction data), as described herein. Additionally or alternatively, perimeter zone system 402a may communicate the encrypted transaction data, the transaction type identifier, and/or the like to enterprise zone system 402b.

In some non-limiting embodiments, enterprise zone system 402b may select a decryption technique (e.g., from a plurality of decryption techniques), e.g., based on the type of transaction associated with the transaction type identifier, the type of transaction associated with the transaction type identifier, and/or the like, as described herein. In some non-limiting embodiments, enterprise zone system 402b may invoke a module associated with the selected decryption technique.

In some non-limiting embodiments, enterprise zone system 402b may retrieve (e.g., request, search for, read, obtain, and/or the like) a private key identifier (e.g., hash of the private key and/or the like, as described herein) from database 402c, as described herein. For example, enterprise zone system 402b may retrieve the private key identifier from database 402c based on the invoked module associated with the type of transaction. Additionally or alternatively, enterprise zone system 402b may retrieve the private key identifier, e.g., from database 102c based on the selected decryption technique, the device identifier included with the encrypted transaction data, and/or the like, as described herein.

In some non-limiting embodiments, enterprise zone system 402b may receive the private key identifier from database 402c. Additionally or alternatively, database 402c may communicate the private key identifier to enterprise zone system 402b (e.g., to the invoked module based on the transaction type).

In some non-limiting embodiments, enterprise zone system 402b may communicate the private key identifier to key vault 402d, as described herein. For example, enterprise zone system 402b may call key vault 402d (e.g., using an API associated with key vault 402d and/or at least one HSM thereof) with the private key identifier. Additionally or alternatively, enterprise zone system 402b may communicate the encrypted transaction data to key vault 402d.

In some non-limiting embodiments, key vault 402d may decrypt the encrypted transaction data to form decrypted transaction data, as described herein. For example, key vault 402d may decrypt the encrypted transaction data using the private key associated with the private key identifier.

In some non-limiting embodiments, key vault 402d may communicate the decrypted transaction data to enterprise zone system 402b, as described herein.

In some non-limiting embodiments, enterprise zone system 402b may parse at least a portion of the decrypted transaction data (e.g., the payload of the decrypted transaction data) based on the transaction type. For example, enterprise zone system 402b may use the module invoked based on the transaction type to parse the payload.

In some non-limiting embodiments, enterprise zone system 402b may communicate the decrypted transaction data and/or the parsed portion thereof to perimeter zone system 402a. Additionally or alternatively, perimeter zone system 402a may communicate the decrypted transaction data and/or the parsed portion thereof to the first computing device, as described herein.

In some non-limiting embodiments, transaction service provider system 402 may monitor activities of other entities (e.g., the first computing device, the computing device(s) associated with the device identifier, and/or the like). For example, the other entities (e.g., the first computing device, the computing device(s) associated with the device identifier, and/or the like) may communicate (e.g., to transaction service provider system 402) encrypted transaction data associated with all types of transactions for which such entities are registered with transaction service provider system 402. For example, such other entities may be unable to decrypt the encrypted transaction data without communicating the encrypted transaction data to transaction service provider system 402. For example, transaction service provider system 402 may be able to decrypt the encrypted transaction data for each transaction and track (e.g., store and/or the like) data associated therewith for such monitoring. As such, transaction service provider system 402 may ensure that each entity complies with applicable requirements (e.g., security standards, regulations, agreements, and/or the like). For example, transaction service provider system 402 may be able to determine if such other entities misreport, miscount, and/or the like transactions (e.g., in contravention of applicable requirements). Additionally or alternatively, such other entities may be prevented from decrypting transaction messages and/or using transaction data in an impermissible manner, since only transaction service provider system 402 may maintain many of the cryptographic keys (e.g., all private cryptographic keys and/or the like associated with the individual transaction types). Additionally, if the other entities request the transaction data be communicated back from transaction service provider system 402 in an encrypted format, transaction service provider system 402 may encrypt the transaction data with a respective public key associated with the respective entity and/or the only private key accessible to the respective entity may be a single respective private key associated with the respective private key.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A computer-implemented method, comprising:
   receiving, by a perimeter zone system of a transaction service provider system, encrypted transaction data associated with a transaction from a first transaction terminal of a merchant system, the encrypted transaction data encrypted using a first public key of the transaction service provider system, the encrypted transaction data comprising a transaction type identifier associated with a type of the transaction and a device identifier associated with the first transaction terminal associated with the transaction;
   communicating, by the perimeter zone system, the encrypted transaction data to an enterprise zone system of the transaction service provider system;
   selecting, by the enterprise zone system, a first decryption technique from a plurality of decryption techniques based on the type of the transaction associated with the transaction type identifier;
   retrieving, by the enterprise zone system, a first private key identifier from a database of private key identifiers based on the first decryption technique and the device identifier;
   communicating, by the enterprise zone system, the first private key identifier and the encrypted transaction data to a key vault;
   determining, by the key vault, a first private key based on the first private key identifier;
   decrypting, by the key vault, the encrypted transaction data using the first private key to form decrypted transaction data;
   receiving, by the enterprise zone system, the decrypted transaction data from the key vault;
   encrypting, by the enterprise zone system, the decrypted transaction data using a second public key of the first transaction terminal to form first transaction data, the second public key associated with the first transaction terminal associated with the device identifier;
   communicating, by the enterprise zone system, the first transaction data to the perimeter zone system;
   communicating, by the perimeter zone system, the first transaction data to the first transaction terminal; and
   decrypting, by the first transaction terminal, the first transaction data using a second private key stored by the first transaction terminal, the second private key associated with the second public key.

2. The method of claim 1, wherein the first transaction terminal comprises a group of transaction terminals.

3. The method of claim 1, wherein the key vault comprises at least one hardware security module (HSM).

4. The method of claim 1, wherein the first transaction data comprises second encrypted transaction data based on the decrypted transaction data.

5. The method of claim 1, wherein the perimeter zone system comprises a first subsystem of the transaction service provider system comprising at least one first computing device exposed to an external network for communicating with at least one external computing device, the at least one external computing device comprising the first transaction terminal of the merchant system, and wherein the enterprise zone system comprises a second subsystem of the transaction service provider system comprising at least one second computing device separate from the at least one first computing device, the enterprise zone system for communicating with the perimeter zone system, the database, and the key vault via at least one internal network.

6. A transaction service provider system, comprising:
   a perimeter zone system, an enterprise zone system, a key vault, and a first transaction terminal;
   the perimeter zone system configured to receive encrypted transaction data associated with a transaction from the first transaction terminal of a merchant system, the encrypted transaction data encrypted using a first public key of the transaction service provider system, the encrypted transaction data comprising a transaction type identifier associated with a type of the transaction and a device identifier associated with the first transaction terminal associated with the transaction, the perimeter zone system further configured to communicate the encrypted transaction data to the enterprise zone system of;
   the enterprise zone system configured to:
      select a first decryption technique from a plurality of decryption techniques based on the type of the transaction associated with the transaction type identifier;
      retrieve a first private key identifier from a database of private key identifiers based on the first decryption technique and the device identifier;
      communicate the first private key identifier and the encrypted transaction data to the key vault;
   the key vault configured to:
      determine a first private key based on the first private key identifier;
      decrypt the encrypted transaction data using the first private key to form decrypted transaction data;
   the enterprise zone system further configured to:
      receive the decrypted transaction data from the key vault;
      encrypt the decrypted transaction data using a second public key of the first transaction terminal to form first transaction data, the second public key associated with the first transaction terminal associated with the device identifier; and
      communicate the first transaction data to the perimeter zone system;
   the perimeter zone system further configured to communicate the first transaction data to the first transaction terminal; and
   the first transaction terminal configured to store a second private key associated with the second public key and further configured to decrypt the first transaction data using the second private key.

7. The system of claim 6, wherein the first transaction terminal comprises a group of transaction terminals.

8. The system of claim 6, wherein the key vault comprises at least one hardware security module (HSM).

9. The system of claim 6, wherein the first transaction data comprises second encrypted transaction data based on the decrypted transaction data.

10. The system of claim 6, wherein the perimeter zone system comprises a first subsystem of the transaction service provider system comprising at least one first computing device exposed to an external network for communicating with at least one external computing device, the at least one external computing device comprising the first transaction terminal of the merchant system, and wherein the enterprise zone system comprises a second subsystem of the transaction service provider system comprising at least one second computing device separate from the at least one first computing device, the enterprise zone system for communicating with the perimeter zone system, the database, and the key vault via at least one internal network.

11. A computer program product comprising at least one non-transitory computer-readable medium including one or more instructions that, when executed by at least one processor, cause the at least one processor to:

receive, by a perimeter zone system of a transaction service provider system, encrypted transaction data associated with a transaction from a first transaction terminal of a merchant system, the encrypted transaction data encrypted using a first public key of the transaction service provider system, the encrypted transaction data comprising a transaction type identifier associated with a type of the transaction and a device identifier associated with the first transaction terminal associated with the transaction;

communicate, by the perimeter zone system, the encrypted transaction data to an enterprise zone system of the transaction service provider system;

select, by the enterprise zone system, a first decryption technique from a plurality of decryption techniques based on the type of the transaction associated with the transaction type identifier;

retrieve, by the enterprise zone system, a first private key identifier from a database of private key identifiers based on the first decryption technique and the device identifier;

communicate, by the enterprise zone system, the first private key identifier and the encrypted transaction data to a key vault;

determining, by the key vault, a first private key based on the first private key identifier;

decrypting, by the key vault, the encrypted transaction data using the first private key to form decrypted transaction data;

receive, by the enterprise zone system, the decrypted transaction data from the key vault;

encrypt, by the enterprise zone system, the decrypted transaction data using a second public key of the first transaction terminal to form first transaction data, the second public key associated with the first transaction terminal associated with the device identifier;

communicate, by the enterprise zone system, the first transaction data to the perimeter zone system; and communicate, by the perimeter zone system, the first transaction data to the first transaction terminal, the first transaction terminal storing a second private key associated with the second public key to decrypt the first transaction data using the second private key.

12. The computer program product of claim 11, wherein the first transaction terminal comprises a group of transaction terminals.

13. The computer program product of claim 11, wherein the key vault comprises at least one hardware security module (HSM).

14. The computer program product of claim 11, wherein the first transaction data comprises second encrypted transaction data based on the decrypted transaction data.

15. The computer program product of claim 11, wherein the perimeter zone system comprises a first subsystem of the transaction service provider system comprising at least one first computing device exposed to an external network for communicating with at least one external computing device, the at least one external computing device comprising the first transaction terminal of the merchant system, and wherein the enterprise zone system comprises a second subsystem of the transaction service provider system comprising at least one second computing device separate from the at least one first computing device, the enterprise zone system for communicating with the perimeter zone system, the database, and the key vault via at least one internal network.

* * * * *